(12) United States Patent
Hwang et al.

(10) Patent No.: US 8,047,898 B2
(45) Date of Patent: Nov. 1, 2011

(54) GRINDER WHEEL FOR LIQUID CRYSTAL DISPLAY DEVICE AND METHOD OF FABRICATING LIQUID CRYSTAL DISPLAY DEVICE USING THE SAME

(75) Inventors: Young Min Hwang, Gyeongsangbuk-Do (KR); Jeong Joon Lee, Incheon (KR); Chang Bo Shim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 410 days.

(21) Appl. No.: 11/318,440

(22) Filed: Dec. 28, 2005

(65) Prior Publication Data

US 2006/0286907 A1 Dec. 21, 2006

(30) Foreign Application Priority Data

Jun. 20, 2005 (KR) .................. 10-2005-0053198

(51) Int. Cl.
B24B 1/00 (2006.01)
(52) U.S. Cl. ................ 451/41; 451/44; 451/55; 451/70
(58) Field of Classification Search .............. 451/41, 451/540, 548, 541, 546, 44, 54, 55, 57, 59, 451/65, 69, 70, 178, 231, 257; 349/187, 349/156, 117
See application file for complete search history.

(56) References Cited

U.S. PATENT DOCUMENTS

| | | | | | |
|---|---|---|---|---|---|
| 2,172,407 | A | * | 9/1939 | Ramey | 451/511 |
| 2,826,015 | A | * | 3/1958 | Osenberg | 451/527 |
| 2,877,105 | A | * | 3/1959 | Smith | 51/308 |
| 2,997,820 | A | * | 8/1961 | Skoog | 451/548 |
| 3,816,997 | A | * | 6/1974 | Rupp | 451/277 |
| 3,867,795 | A | * | 2/1975 | Howard | 451/548 |
| 3,896,593 | A | * | 7/1975 | Rine | 451/548 |
| 4,538,383 | A | * | 9/1985 | Le Marer et al. | 451/13 |
| 4,726,150 | A | * | 2/1988 | Nishio et al. | 451/271 |
| 5,092,083 | A | * | 3/1992 | Raffaelli | 451/541 |
| D328,696 | S | * | 8/1992 | Acheson | D8/70 |
| 5,243,790 | A | * | 9/1993 | Gagne | 451/528 |
| 5,435,217 | A | * | 7/1995 | Kato et al. | 83/100 |
| 5,567,503 | A | * | 10/1996 | Sexton et al. | 428/143 |
| 5,720,649 | A | * | 2/1998 | Gerber et al. | 451/41 |
| 5,876,470 | A | * | 3/1999 | Abrahamson | 51/309 |

(Continued)

FOREIGN PATENT DOCUMENTS

DE 6932945 9/1970

(Continued)

*Primary Examiner* — Eileen P. Morgan
(74) *Attorney, Agent, or Firm* — McKenna Long & Aldridge, LLP

(57) ABSTRACT

A grinder wheel for a liquid crystal display device and a method of fabricating a liquid crystal display device using the same are provided. Two grinding surfaces are formed in the grinder wheel used for grinding a substrate so that it is possible to improve grinding characteristics, to increase the life of the grinder wheel, and to reduce grinding time. The method includes cutting the substrates attached to each other into a plurality of unit liquid crystal display panels, loading the unit liquid crystal display panel on a grinding table, grinding a predetermined region of the liquid crystal display panel using a grinder wheel including two grinding surfaces of a first grinder surface for primary grinding and a second grinder surface for secondary grinding, and unloading the ground liquid crystal display panel.

6 Claims, 5 Drawing Sheets

U.S. PATENT DOCUMENTS

| | | | |
|---|---|---|---|
| 6,196,911 B1* | 3/2001 | Preston et al. | 451/548 |
| 6,224,473 B1* | 5/2001 | Miller et al. | 451/461 |
| 6,312,324 B1* | 11/2001 | Mitsui et al. | 451/540 |
| 6,402,600 B1 | 6/2002 | Besch | 451/268 |
| 6,554,689 B2* | 4/2003 | Ohkuma et al. | 451/262 |
| 6,685,541 B2* | 2/2004 | Brown et al. | 451/41 |
| 6,755,724 B2* | 6/2004 | Shin et al. | 451/64 |
| 6,769,969 B1* | 8/2004 | Duescher | 451/59 |
| 6,926,598 B2* | 8/2005 | Toge et al. | 451/540 |
| 7,048,614 B2* | 5/2006 | Uh et al. | 451/41 |
| 7,118,449 B1* | 10/2006 | Dinger et al. | 451/6 |
| 7,163,445 B2* | 1/2007 | Uh et al. | 451/41 |
| 7,179,155 B2* | 2/2007 | Shin et al. | 451/65 |
| 7,507,146 B2* | 3/2009 | Kato et al. | 451/41 |
| 2001/0006876 A1* | 7/2001 | Kondo et al. | 451/44 |
| 2001/0041513 A1* | 11/2001 | Nishi et al. | 451/44 |
| 2003/0190862 A1* | 10/2003 | Chae et al. | 451/5 |
| 2004/0040864 A1* | 3/2004 | Mizuno | 205/662 |
| 2005/0020186 A1* | 1/2005 | Schneider et al. | 451/41 |
| 2005/0032469 A1* | 2/2005 | Duescher | 451/548 |

FOREIGN PATENT DOCUMENTS

| | | |
|---|---|---|
| DE | 203 02 830 U1 | 6/2003 |
| EP | 1 462 217 | 9/2004 |
| EP | 1 462 217 A1 | 9/2004 |
| JP | 55-137867 A | 10/1980 |
| JP | 60-009661 A | 1/1985 |
| JP | 03-264267 | 11/1991 |
| JP | 8-323598 A | 12/1996 |
| JP | 11207636 | 8/1999 |
| JP | 2001062734 | 3/2001 |
| JP | 2001-087998 | 4/2001 |
| KR | 1020020012837 | 2/2002 |
| KR | 1020020054872 | 7/2002 |

\* cited by examiner

GRINDER WHEEL FOR LIQUID CRYSTAL DISPLAY DEVICE AND METHOD OF FABRICATING LIQUID CRYSTAL DISPLAY DEVICE USING THE SAME

This application claims the benefit of the Korean Patent Application No. P2005-53198, filed on, Jun. 20, 2005, which is hereby incorporated by reference for all purposes as if fully set forth herein.

BACKGROUND OF THE INVENTION

1. Field of the Invention

The present invention relates to a grinder wheel for a liquid crystal display device, and more particularly, to a grinder wheel for a liquid crystal display device for cutting liquid crystal display panels fabricated on a large mother substrate into separate unit liquid crystal display panels to grind unit liquid crystal display panels and a method of fabricating a liquid crystal display (LCD) device using the same.

2. Description of the Related Art

Recently, with increasing interest in information displays and request for using portable information media, thin and light flat panel displays (FPD) that replace cathode ray tubes (CRT) that are conventional displays have been studied and commercialized. In particular, among the FPDs, LCD device displays images using optical anisotropy of liquid crystal and have excellent resolution, color display, and picture quality to be actively applied to notebooks and desktop monitors.

Hereinafter, the LCD device will be described in detail.

A common LCD device is composed of a liquid crystal display panel including a driving circuit unit, a back light unit provided under the liquid crystal display panel to emit light to the liquid crystal display panel, a mold frame that supports the back light unit and the liquid crystal display panel, and a case.

The liquid crystal display panel is composed of a color filter substrate, an array substrate, and a liquid crystal layer formed between the color filter substrate and the array substrate.

The color filter substrate is composed of a color filter composed of red (R), green (G), and blue (B) sub-color filters, black matrix provided among the sub-color filters to intercept the light that passes through the liquid crystal layer, and transparent common electrodes that apply a voltage to the liquid crystal layer.

The array substrate is composed of a plurality of gate lines and data lines vertically and horizontally arranged on the substrate to define a plurality of pixel regions, thin film transistors (TFT) that are switching devices formed in the regions where the gate lines intersect the data lines, and pixel electrodes formed on the pixel regions.

The array substrate and the color filter substrate of the above-described structures are attached to each other by a sealant formed in the outline of an image display region to face each other so that the liquid crystal display panel is obtained. The two substrates are attached to each other by an attachment key formed in the array substrate or the color filter substrate.

In general, according to a liquid crystal display device, in order to improve yield, TFT array substrates are formed on a large mother substrate, color filter substrates are formed on another mother substrate, and then the two mother substrates are attached to each other to simultaneously form a plurality of liquid crystal display panels. At this time, a process of cutting the liquid crystal display panels into a plurality of unit liquid crystal display panels is required.

In general, the unit liquid crystal display panels are cut by forming scribing grooves on the surface of the mother substrate using a wheel whose hardness is larger than the hardness of glass so that crack is transmitted along the scribing grooves. Such a liquid crystal display panel will be described in detail with reference to the attached drawings.

FIG. 1 schematically illustrates the structure of the section of liquid crystal display panels obtained by attaching a first mother substrate on which TFT array substrates are formed and a second mother substrate on which color filter substrates are formed to each other.

As illustrated in FIG. 1, the unit liquid crystal display panels are formed so that one side of each of TFT array substrates 1 is longer than one side of each of color filter substrates 2. This is because gate pad units (not shown) and data pad units (not shown) are formed at the edges of the TFT array substrates 1 that do not overlap the color filter substrates 2.

Therefore, the color filter substrates 2 formed on the second mother substrate 30 are separated from each other by a first dummy region 31 corresponding to the area by which the TFT array substrates 1 formed on the first mother substrate 20 are longer than the color filter substrates 2.

Also, the unit liquid crystal display panels are properly arranged to maximally use the first and second mother substrates 20 and 30. In general, the unit liquid crystal display panels are separated from each other by a second dummy region 32, which vary with a model.

After the first mother substrate 20 on which the TFT array substrates 1 are formed and the second mother substrate 30 on which the color filter substrates 2 are formed are attached to each other, the liquid crystal display panels are cut into unit liquid crystal display panels. At this time, the first dummy regions 31 by which the color filter substrates 2 of the second mother substrate 30 are separated from each other and the second dummy regions 32 by which the unit liquid crystal display panels are separated from each other are simultaneously removed.

After cutting the liquid crystal display panels from the second mother substrate 30, the sharp edges of the unit liquid crystal display panels are ground so that it is possible to prevent the short wiring lines formed at the edges of the TFT array substrates 1 in order to intercept static electricity that can be generated when a conductive film is formed on the TFT array substrates 1 from being removed, to prevent pieces from being broken out of the edges of the unit liquid crystal display panels due to external shock, and to prevent a worker from being damaged by the sharp edges of the unit liquid crystal display panels during processes.

That is, as illustrated in FIG. 2, protrusion ends 40 that protrude outside are formed on the sides of the array substrates 1 and the color filter substrates 2 that are cut by shock. The protrusion ends 40 are commonly generated in all parts where the scribing grooves intersect each other.

The protrusion ends 40 are removed using a grinder wheel. FIG. 3 is a plan view schematically illustrating the structure of a common grinder wheel.

As illustrated in FIG. 3, in a grinder wheel 70, a grinder surface 74 is formed at the edge of the top surface of a disk-shaped grinder device 71.

A hole 77 is formed in the center of the grinder wheel 70 in order to load the grinder device 71 in the spin of a motor.

In general, the grinder wheel 70 including one grinder surface 74 is used for a process of grinding liquid crystal display panels. When the liquid crystal display panels are ground by one grinder surface 74, since the same grinder surface 74 must be continuously used, the life of the grinder wheel 70 is reduced. Also, since the area of the protrusion end (40 of FIG. 2) that contacts the grinder wheel 74 is small during high speed grinding, the part that is not ground exists.

Also, when the grinder wheel 70 is used for a long time, the specific part of the grinder surface 74 is abraded so that grinding quality deteriorates since the same part is continuously used.

SUMMARY OF THE INVENTION

In order to solve the above problems, it is an advantage of the present invention to provide a grinder wheel for a liquid crystal display device capable of improving grinding quality during a grinding process and of increasing a period of exchanging the grinder wheel and a method of fabricating a liquid crystal display device using the same.

It is another advantage of the present invention to provide a grinder wheel for a liquid crystal display device capable of reducing grinding defect in which grinding is non-uniformly performed during high speed grinding and a method of fabricating a liquid crystal display device using the same.

It is still another advantage of the present invention to provide a grinder wheel for a liquid crystal display device capable of reducing grinding time to improve product yield and a method of fabricating a liquid crystal display device using the same.

In order to achieve the above advantages, there is provided a grinder wheel comprising a cylindrical body, a first grinder surface formed on top edge of the body, and a second grinder surface formed inside the first grinder surface.

Also, there is provided a method of grinding a liquid crystal display panel, the method comprising the steps of loading a unit liquid crystal display panel on a grinding table, grinding a predetermined region of the liquid crystal display panel using a grinder wheel including two grinding wheels of a first grinder surface for performing primary grinding and a second grinder surface for performing secondary grinding, and unloading the ground liquid crystal display panel.

Also, there is provided a method of fabricating a liquid crystal display device, the method comprising the steps of providing liquid crystal display substrates, performing an array process or a color filter process on the substrates, attaching the two substrates to each other after performing the array process and the color filter process, cutting the substrates attached to each other into a plurality of unit liquid crystal display panels, loading the unit liquid crystal display panel on a grinding table, grinding a predetermined region of the liquid crystal display panel using a grinder wheel including two grinding surfaces of a first grinder surface for primary grinding and a second grinder surface for secondary grinding, and unloading the ground liquid crystal display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

For example, embodiments of a grinder wheel for a liquid crystal display device according to the present invention and a method of fabricating a liquid crystal display device using the same will be described in detail with reference to the attached drawings.

Figure 1:
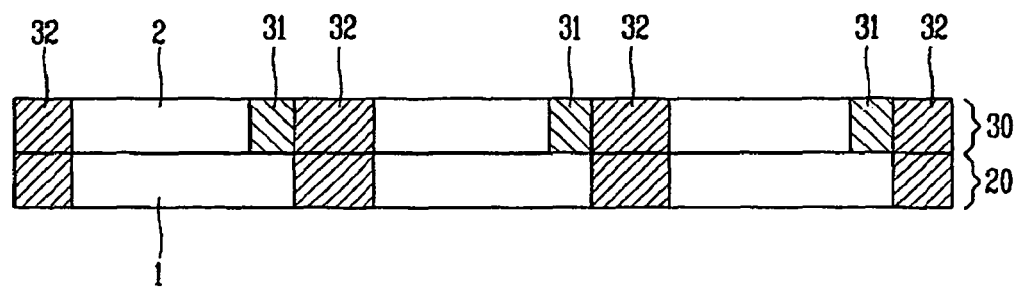
FIG. 1 schematically illustrates the structure of the section of liquid crystal display panels obtained by attaching a first mother substrate on which thin film transistor (TFT) array substrates are formed and a second mother substrate on which color filter substrates are formed to each other.
Figure 2:
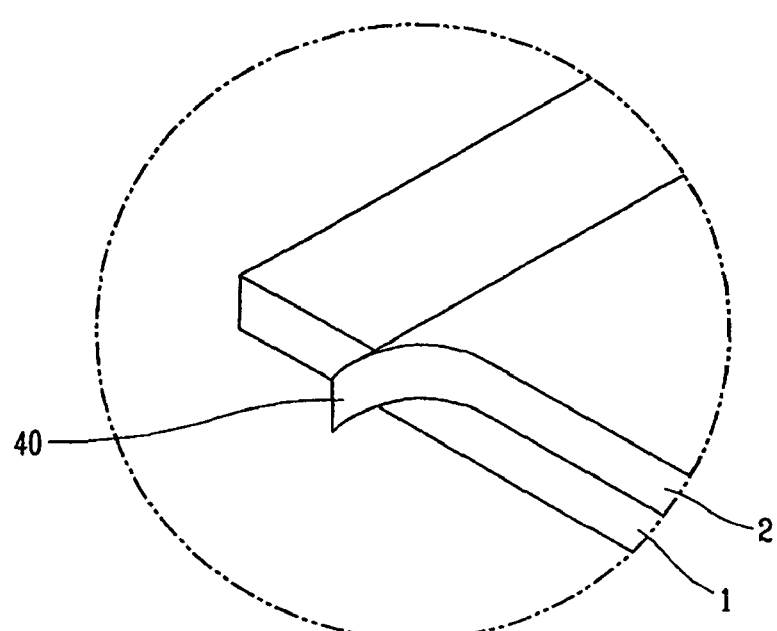
FIG. 2 illustrates an enlarged protrusion end of a cut substrate.
Figure 3:
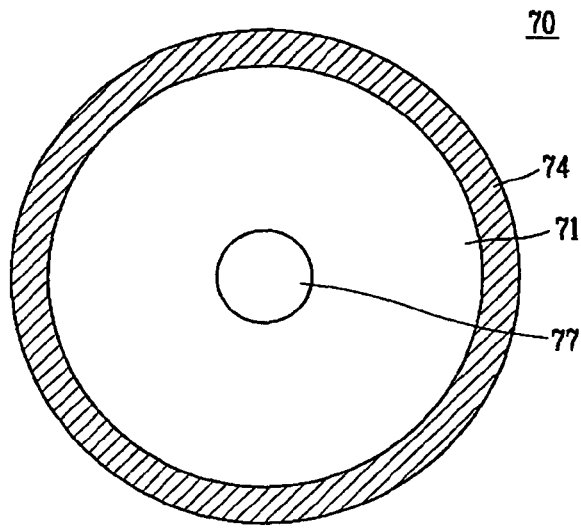
FIG. 3 is a plan view schematically illustrating the structure of a common grinder wheel.
Figure 4:
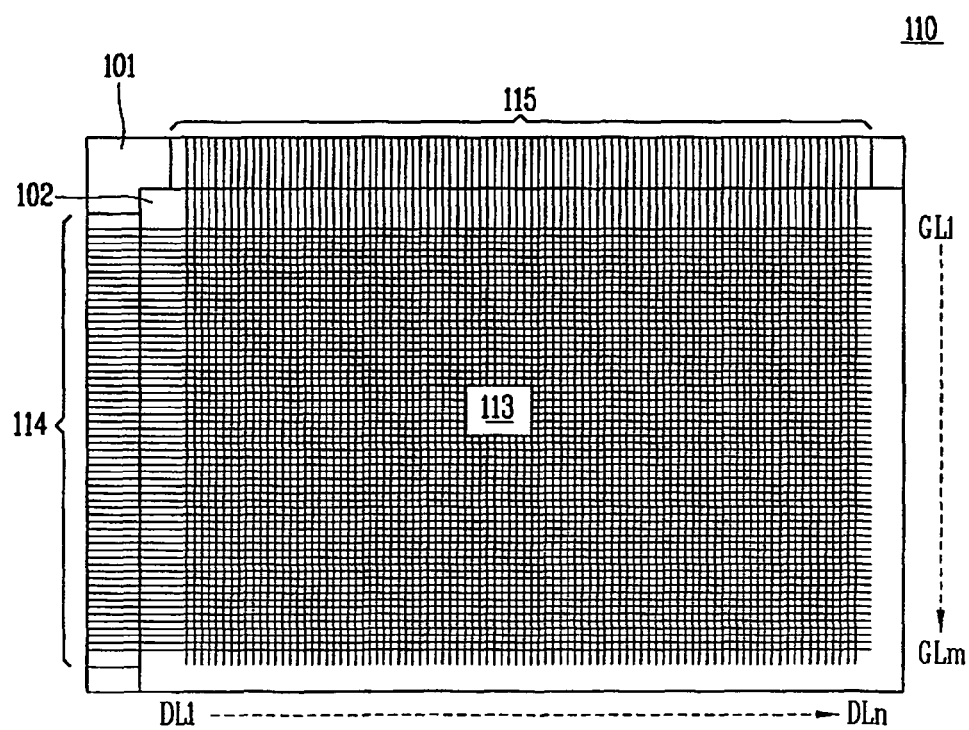
FIG. 4 is a plan view schematically illustrating the structure of a unit liquid crystal display panel cut by a grinder wheel according to the present invention.

FIG. 4 is a plan view schematically illustrating the structure of a unit liquid crystal display panel cut by a grinder wheel according to the present invention.

As illustrated in FIG. 4, a unit liquid crystal display panel 110 includes a pixel unit 113 that is an image display region in which liquid crystal cells are arranged in a matrix, a gate pad unit 114 for connecting the gate wiring lines GL1 to GLm of the pixel unit 113 to a gate driver integrated circuit (not shown) to which gate signals are applied, and a data pad unit 115 for connecting the data wiring lines DL1 to DLn of the pixel unit 113 to a data driver integrated circuit (not shown) to which image information is applied.

At this time, the gate pad unit 114 and the data pad unit 115 are formed at the edge of a thin film transistor (TFT) array substrate 101 whose one short side and whose one long side are longer than those of a color filter substrate 102.

Here, although not shown in the drawing, TFTs for switching liquid crystal cells and pixel electrodes connected to the TFTs to apply electric field to the liquid crystal cells are provided in the regions where the data wiring lines DL1 to DLn and the gate wiring lines GL1 to GLm of the TFT array substrate 101 intersect each other.

Color filters divided into cell regions by black matrix and common electrodes corresponding to the pixel electrodes formed on the TFT array substrate 101 are included in the color filter substrate 102.

The TFT array substrate 101 and the color filter substrate 102 of the above-described structures are attached to each other by a seal pattern (not shown) formed in the outline of the pixel unit 113 with a cell gap provided so that the TFT array substrate 101 and the color filter substrate 102 are separated from each other by a uniform distance to face each other. A liquid crystal layer (not shown) is formed in the space between the TFT array substrate 101 and the color filter substrate 102.

The structure of a grinder wheel according to the present invention for grinding the cut unit liquid crystal display panel will be described in detail with reference to the attached drawings.

Figure 5A:
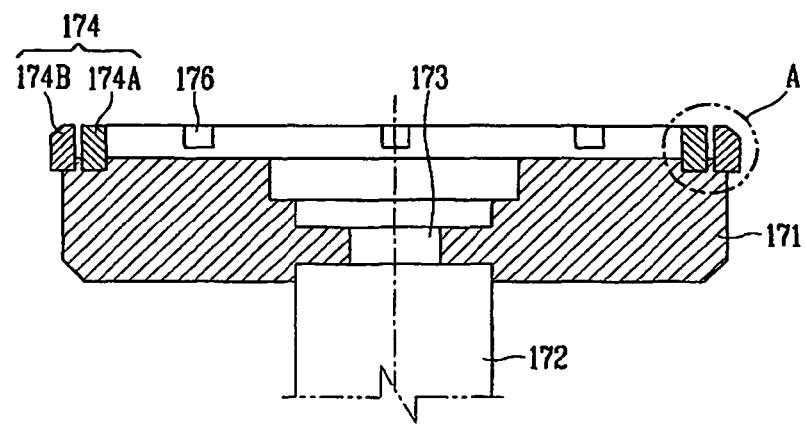
FIGS. 5A and 5B are a sectional view and a plan view schematically illustrating a grinder wheel according to a first embodiment of the present invention.
Figure 5B:
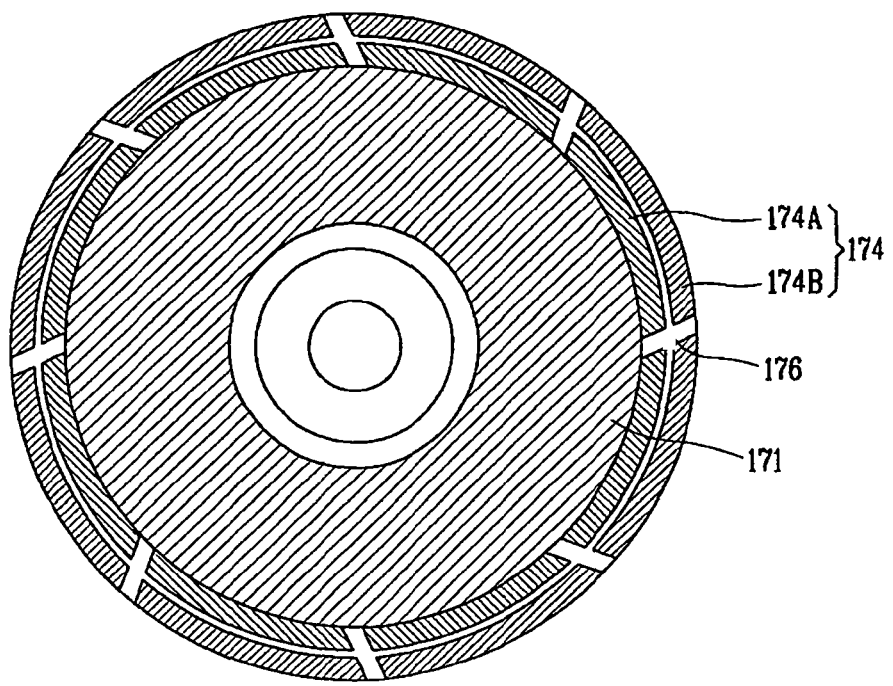

FIGS. 5A and 5B are a sectional view and a plan view schematically illustrating a grinder wheel according to a first embodiment of the present invention.

As illustrated in FIGS. 5A and 5B, in a grinder wheel 170 according to the present embodiment, a main shaft 172 and a rotation shaft 173 extended from the main shaft 172 to rotate in the same direction as the main shaft 172 are formed in a cylindrical body 171.

A two grinding surface 174 formed of a first grinder surface 174A and a second grinder surface 174B for grinding liquid crystal display panels is formed on top of the cylindrical body 171. The first grinder surface 174A and the second grinder surface 174B are referred to as grindstones and are ring-shaped. In particular, since the grinder surface 174 grinds a glass substrate, the grinder surface 174 is formed of a material whose hardness is larger than the hardness of glass. Diamond, quartz, and diatomite as natural materials and silicon carbide, aluminum oxide, iron oxide, and chrome oxide as artificial materials are used as the grinder surface 174.

The grinder surface 174 included in the grinder wheel 170 according to the present embodiment is composed of the first grinder surface 174A and the second grinder surface 174B formed inside and outside the top surface of the grinder wheel 170. Here, the external grinder surface 174B is formed of a grindstone having a large amount of roughness for rough grinding and the internal grinder surface 174A is formed of a grindstone having a small amount of roughness for precise grinding. At this time, difference in roughness between the external grinder surface 174B and the internal grinder surface 174A is about 50 to 100 Mesh. However, the present invention is not limited to the above. The first grinder surface 174A and the second grinder surface 174B may have the same roughness.

The main shaft 172 is connected to a power shaft (not shown) that provides torque so that the rotation shaft 173 rotates.

The rotation shaft 173 transmits the torque applied from the main shaft 172 to the first and second grinder surfaces 174A and 174B.

Also, the first grinder surface 174A and the second grinder surface 174B may be divided into a plurality of parts as illustrated in FIG. 5B through a plurality of groves 176 formed along the two grinding surface 174. However, the present invention is not limited to the above. A single structured grinder wheel illustrated in FIG. 6 may be used.

Figure 6:
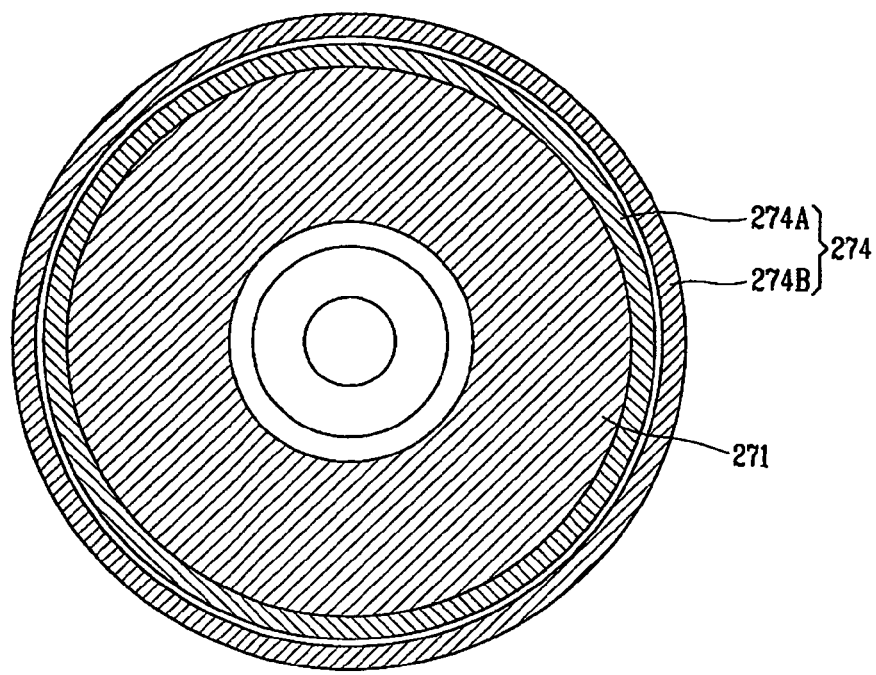
FIG. 6 is a plan view schematically illustrating a grinder wheel according to a second embodiment of the present invention.

FIG. 6 is a plan view schematically illustrating a grinder wheel according to a second embodiment of the present invention. As illustrated in FIG. 6, in a grinder wheel 270, a two grinding surface 274 is not divided. Here, the structure of the grinder wheel 270 according to the second embodiment is the same as the structure of the grinder wheel according to the first embodiment. That is, the two grinding surface 274 including the first grinder surface 274A and the second grinder surface 274B is provided on top of a cylindrical body 271.

Figure 7:
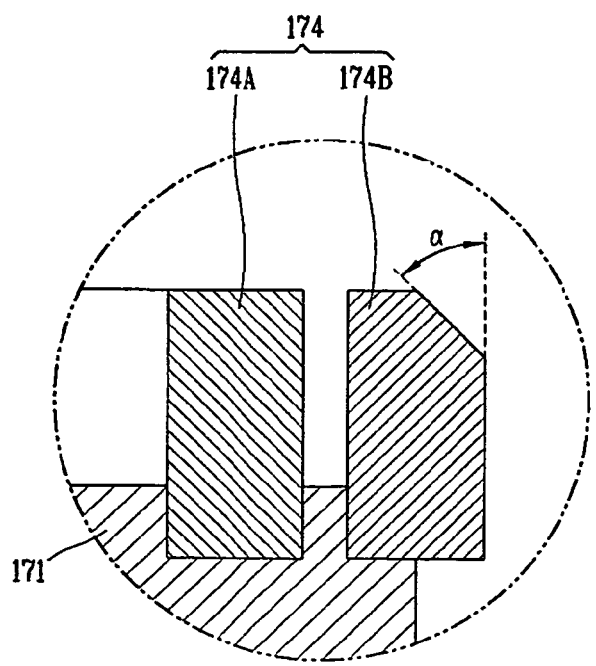
FIG. 7 is a sectional view illustrating an enlarged grinder surface of the grinder wheel illustrated in FIGS. 5A and 5B.

FIG. 7 is a sectional view illustrating an enlarged grinder surface of the grinder wheel A illustrated in FIGS. 5A and 5B.

As illustrated in FIG. 7, the grinder wheel 170 according to the present embodiment includes the first grinder surface 174A for primary grinding and the second grinder surface 174B for secondary grinding. The first grinder surface 174A and the second grinder surface 174B are separated from each other by a uniform distance.

Here, the second grinder surface 174B has a predetermined inclination angle a at the external edge region in order to protect the glass substrate of liquid crystal display panels during grinding. The inclination angle α of the second grinder surface 174B is about 20 to 40°, preferably, 30° with respect to the longitudinal direction (the X axis direction) of the second grinder surface 174B.

As described above, the first grinder surface 174A and the second grinder surface 174B may be formed of the same grindstone. When the secondary grinding is performed after performing the primary grinding, the first grinder surface 174A and the second grinder surface 174B may be formed of grindstones having different amounts of roughness.

When the two grinding surface 174 having different amounts of roughness is used, the grinder wheel 170 and the protrusion end (not shown) of the substrate proceed in opposite directions so that the protrusion end is roughly ground by the second grinder surface 174B formed outside and then, is precisely ground by the first grinder surface 174A formed inside. Here, according to the present embodiment, the primary grinding is performed using the external second grinder surface 174B and then, the secondary grinding is performed using the internal first grinder surface 174A. However, the present invention is not limited to the above. The grinder surfaces 174A and 174B for the primary grinding and the secondary grinding may be used in the reverse order. Also, according to the present invention, the first grinder surface 174A and the second grinder surface 174B may be simultaneously used.

When the double grinding is performed using the two grinder surfaces 174A and 174B, it is possible to improve grinding characteristics and to reduce grinding time. Also, when grinding is performed with the protrusion end simultaneously contacting the external and internal grinder surfaces 174A and 174B of the grinder wheel 170, contact area increases so that the concentration on the grinder surfaces 174A and 174B is distributed during grinding. As a result, it is possible to increase the life of the grinder wheel 174. Hereinafter, a grinding method using the grinder wheel 170 will be described in detail with reference to the drawings.

Figure 8:
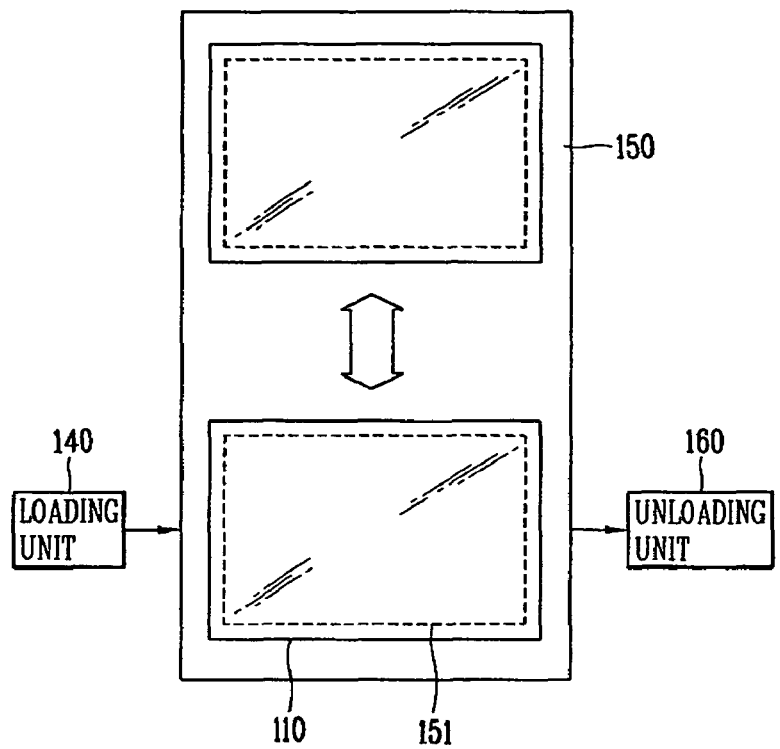
FIG. 8 schematically illustrates grinding processes of the present invention.
Figure 9:
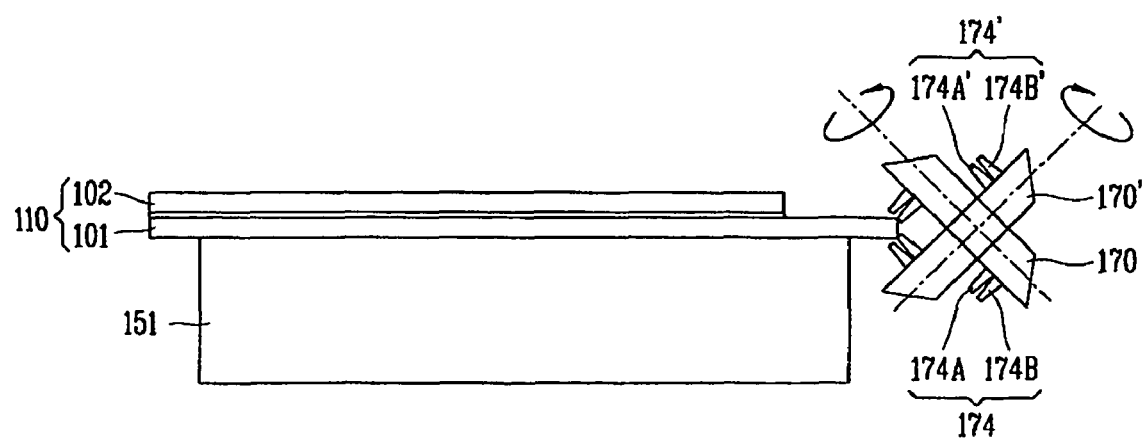
FIG. 9 is a sectional view schematically illustrating a grinding method using the grinder wheel according to the present invention.

FIG. 8 schematically illustrates grinding processes according to the present invention. FIG. 9 schematically illustrates a grinding method using the grinder wheel according to the present invention.

Processes of grinding the edge of the liquid crystal display panel loaded on a grinding table 151 using the grinder wheel according to the present invention will be described with reference to FIG. 9.

Referring to FIG. 9, a cut unit liquid crystal display panel 110 is transported to a loading unit 140 for grinding the cut surface and the edge thereof. Here, the unit liquid crystal display panel 110 is fabricated through a driving device array process of forming a driving device on a bottom array substrate 101, a color filter process of forming a color filter on a top color filter substrate 102, and a cell process. The processes of fabricating the liquid crystal display panel will be described as follows.

First, a plurality of gate lines and data lines arranged on the bottom array substrate 101 by the array process to define pixel regions are formed. TFTs that are driving devices connected to the gate lines and the data lines are formed in the pixel regions, respectively. Also, pixel electrodes connected to the TFTs through the array process so that signals are applied through the TFTs to drive a liquid crystal layer are formed.

A color filter layer composed of red, green, and blue subcolor filters that realize colors by the color filter process, black matrix, and common electrodes are formed on the top color filter substrate 102.

Then, after forming alignment films on the surfaces of the array substrate 101 and the color filter substrate 102, respectively, the alignment films are rubbed in order to provide alignment controlling force or surface fixation force (that is, a pre-tilt angle and an alignment direction) to the liquid crystal molecules of the liquid crystal layer formed between the array substrate 101 and the color filter substrate 102. Then, after spacers for maintaining the cell gap between the array substrate 101 and the color filter substrate 102 uniform are scattered on the array substrate 101 and a sealant is provided in the outline of the color filter substrate 102, the array substrate 101 and the color filter substrate 102 are pressed to be attached to each other.

The array substrate 101 and the color filter substrate 102 are formed of a large glass substrate. That is, since a plurality of panel regions are formed on the large glass substrate and the array substrate 101 or the color filter substrate 102 is formed in each of the panel regions, in order to obtain a unit liquid crystal display panel 100, the glass substrate must be cut and processed.

To this end, a scribing line is formed on the surface of each or either of the array substrate 101 and the color filter substrate 102 that are attached to each other and cutting is performed along the scribing line so that the unit liquid crystal display panel 110 is obtained.

When the scribing process is completed, the cut surface and the edge of the glass substrate are not smooth. Therefore, the cut surface and the edge must be ground to be smooth.

After the unit liquid crystal display panel 110 loaded on the loading unit 140 is transported to the grinding table 151 and is aligned on the grinding table 151, the cut surface and the edge of the unit liquid crystal display panel 110 are ground by two grinding surfaces 174 and 174' that rotate at high speed.

The grinding table 151 may be designed to be slightly smaller than the unit liquid crystal display panel 110 so that the edge of the unit liquid crystal display panel 110 is ground to be inclined and that the unit liquid crystal display panel 110 can be effectively supported. Therefore, the edge of the unit liquid crystal display panel 110 slightly protrudes against the grinding table 151.

Here, reference numerals 170 and 170' denote the first grinder wheel and the second grinder wheel for grinding the top and bottom edges of the array substrate 101 and the color filter substrate 102. The grinder wheels 170 and 170' move in one direction to grind the top and bottom edges of the array substrate 101 or the color filter substrate 102.

At this time, the first grinder wheel 170 and the second grinder wheel 170' according to the present embodiment include the two grinding surfaces 174 and 174'. The grinder surfaces 174 and 174' of the first grinder wheel 170 and the second grinder wheel 170' are composed of first grinder surfaces 174A and 174A' for performing primary grinding and second grinder surfaces 174B and 174B' for performing secondary grinding.

When grinding is performed using the two grinding surfaces 174 and 174' each composed of two grindstones, grinding can be performed twice so that it is possible to improve grinding quality and that the concentration on the grindstones is distributed to increase the life of the grinder surfaces 174 and 174'. Also, according as the life of the grinder surfaces 174 and 174' increases, it is possible to increase the exchange time of the grinder surfaces 174 and 174' so that it is possible to reduce expenses and process loss.

The primary grinding using the first grinder surfaces 174A and 174A' and the secondary grinding using the second grinder surfaces 174B and 174B' may be simultaneously performed. After performing the primary grinding using the first grinder surfaces 174A and 174A', the secondary grinding using the second grinder surfaces 174B and 174B' may be sequentially performed. To the contrary, after performing the primary grinding using the second grinder surfaces 174B and 174B', the secondary grinding using the first grinder surfaces 174A and 174A' may be sequentially performed.

The grinding table 151 on which the liquid crystal display panel 110 is loaded or the grinder wheels 170 and 170' may be moved during performing the primary grinding and the secondary grinding and then, grinding may further proceed or grinding may be performed while moving the grinding table 151 or the grinder wheels 170 and 170'.

According to the present embodiment, the two grinder wheels 170 and 170' are used for grinding the glass substrates 101 and 102 of the liquid crystal display panel 110. However, the present invention is not limited to the above. One or three or more grinder wheels may be used.

Then, the ground unit liquid crystal display panel 110 is transmitted from the grinding unit 150 to be unloaded to an unloading unit 160 and is transported for the next process.

The invention being thus described, it will be obvious that the same may be varied in many ways. Such variations are not to be regarded as a departure from the spirit and scope of the invention, and all such modifications as would be obvious to one skilled in the art are intended to be comprised within the scope of the following claims.

What is claimed is:

1. A method of fabricating a liquid crystal display device, the method comprising the steps of:
providing array and color filter substrates;
performing an array process on the array substrate and a color filter process on the color filter substrate;
attaching the array and color filter substrates to each other;
cutting the array and color filter substrates attached to each other into a plurality of unit liquid crystal display panels;
loading the unit liquid crystal display panel on a grinding table;
providing a grinder wheel including a disk-shaped body having a disk-shaped surface, a first grinding part and a second grinding part located on the disk-shaped surface,
wherein the second grinding part is an annular grinding ring formed at a peripheral edge of the disk-shaped surface and the first grinding part is an annular grinding ring formed inside and concentric with the second grinding part, and
wherein the second grinding part includes a flat second grinding surface and an inclined region at an external edge of the second grinding surface and the first grinding part includes only a flat first grinding surface;
primary grinding a predetermined edge region of the liquid crystal display panel using the second grinding surface of the second grinding part;
secondarily grinding the predetermined edge region of the liquid crystal display panel using the first grinding surface of the first grinding part,
wherein the inclined region forms an inclination angle in order to protect a glass substrate of the unit liquid crystal display panel during grinding, and the inclination angle is 20 to 40° with respect to the longitudinal direction thereof, and
wherein the second grinding part and the first grinding part are formed of grindstones having different amounts of roughness; and
unloading the ground liquid crystal display panel.

2. The method of claim 1, further comprising the step of aligning the loaded liquid crystal display panel on the grinding table.

3. The method of claim 1, wherein the cut surface and the edge of a liquid crystal display panel are ground using the grinder wheel.

4. The method of claim 1, wherein the primary grinding and the secondary grinding are simultaneously performed.

5. The method of claim 1, wherein a predetermined edge region of the primarily ground liquid crystal display panel is secondarily ground after performing the primary grinding.

6. The method of claim 1, wherein the liquid crystal display panel is ground while moving the grinder wheel in one direction.

* * * * *